United States Patent [19]

Potter

[11] Patent Number: 4,493,571

[45] Date of Patent: Jan. 15, 1985

[54] PRINT GUIDE MECHANISM

[75] Inventor: John T. Potter, Locust Valley, N.Y.

[73] Assignee: Iquad Company Incorporated, Locust Valley, N.Y.

[21] Appl. No.: 476,666

[22] Filed: Mar. 18, 1983

Related U.S. Application Data

[63] Continuation-in-part of Ser. No. 310,189, Oct. 9, 1981, Pat. No. 4,440,038, and a continuation-in-part of Ser. No. 407,841, Aug. 13, 1982, Pat. No. 4,423,970, which is a continuation of Ser. No. 190,680, Sep. 24, 1980, abandoned.

[51] Int. Cl.[3] .......................... B41J 1/30; F16H 55/18

[52] U.S. Cl. .............................. 400/144.2; 101/93.19; 400/320; 400/328; 74/409; 74/440

[58] Field of Search .................. 400/144.2, 144.3, 320, 400/322, 328, 556, 616.1, 616.2; 101/93.19; 74/409, 440, 441

[56] References Cited

U.S. PATENT DOCUMENTS

| | | | |
|---|---|---|---|
| 2,441,168 | 5/1948 | Richardson | 74/441 X |
| 3,331,257 | 7/1967 | Gerber | 74/441 X |
| 3,356,199 | 12/1967 | Robinson | 400/144.3 |
| 3,613,856 | 10/1971 | Reed | 400/145.1 |
| 3,651,915 | 3/1972 | Folkens | 400/144.3 |
| 3,651,916 | 3/1972 | Becchi | 400/144.3 |
| 3,760,925 | 9/1973 | Bossi | 400/144.3 |
| 3,945,481 | 3/1976 | Lindberg | 400/320 X |
| 4,044,880 | 8/1977 | Martin | 400/51 |
| 4,299,502 | 11/1981 | Harre | 400/144.2 |
| 4,338,035 | 7/1982 | Kondo et al. | 400/144.2 |
| 4,392,757 | 7/1983 | Denny et al. | 400/328 |
| 4,412,704 | 11/1983 | Gagnebin | 400/328 X |

*Primary Examiner*—Paul T. Sewell

*Attorney, Agent, or Firm*—Nolte, Nolte and Hunter

[57] ABSTRACT

A printing mechanism includes a right-angle drive for imparting rotation to a rotary printing element having printing type thereon, rotation of the print element selecting a specific character to be imprinted on a printing medium. The right-angle drive permits the printing element to be moved transversely of the printing medium while receiving rotational mechanical signals for imparting the requisite rotation to the printing element. A shaft having a longitudinal keyway therein passes though a bevel gear of the right-angle drive, there being a key extending from the gear to the keyway to permit the sliding of the gear along the shaft while being controlled in rotation thereabout. A carriage carrying the rotary print element and the right-angle drive is driven in the transverse direction by a worm gear having a worm surface provided with inclined sides which mate with a pair of angled inclined rollers supported by the carriage for engagement with the worm gear. The inclined rollers, the keyway, and a spring forcing together gears of the right-angle drive inhibit any backlash to permit an accurate printing of a message. The foregoing mechanical configuration avoids undue complexity so as to permit rapid operation of the printing mechanism.

25 Claims, 10 Drawing Figures

PRINT GUIDE MECHANISM

This application is a CIP of Ser. No. 310,189, filed Oct. 9, 1981, now U.S. Pat. No. 4,440,038, and of Ser. No. 407,841, filed Aug. 13, 1982, now U.S. Pat. No. 4,423,970, which is a continuation of Ser. No. 190,680, filed Sept. 24, 1980, abandoned.

BACKGROUND OF THE INVENTION

This invention relates to printing apparatus and, more particularly, to an electromagnetic control system for the print head in a printing system.

Automatic typewriters and other printing systems are in wide use today. Of particular interest is the form of printer which receives its instructions from a memory or other storage system. Such a memory is found, for example, in word processors wherein an entire text is stored for printout at a later time. Electronic signals from the memory are applied to the print mechanism for the selection of characters to be printed and for the designations of margins, indentations and other characteristics of a document which is to be printed.

One desirable characteristic which is found in such printers is the capability to print properly and accurately, such printers printing more rapidly and more accurately than a human typist.

However, a problem arises in that, for many types of printers currently on the market, attempts to increase the speed of printing results in excess complexity and attempts at reduced complexity may result in errors.

SUMMARY OF THE INVENTION

It thus becomes a major object of the invention to provide for rapid printing with reduced complexity of electromagnetic drives utilized in the construction of printers while maintaining high accuracy in the printing process. In accordance with the invention, a print system is provided wherein the type for each character to be printed is set within a rotary print element. Selection of the desired character is obtained by rotation of the print element to place the desired character beneath a hammer which strikes the portion of the print element containing the desired character. In a preferred embodiment of the invention, a daisy wheel is utilized as the rotary print element and a right-angle mechanical drive is coupled to the rotary print element for rotation thereof. A feature of the invention is the carrying of beveled gears of the right-angle drive upon a movable carriage which advances transversely of a sheet of paper to be printed. The carriage also carries the rotary print element for the successive printings of the characters of the message.

One of the beveled gears has a central bore which rides along a rotatable shaft, the beveled gear being slidably keyed to the shaft for rotation therewith. The rotatable shaft is in the nature of a spline and contains a pair of longitudinal grooves which are coupled by linear bearings to the beveled gear. The linear bearings provide for the sliding of the beveled gear along the keyway while providing sufficiently close and precise contact with the edges of the grooves so as to essentially remove all backlash which might otherwise be associated with rotation of the shaft. A disc, or Belleville, spring keep the gears tightly meshed to prevent backlash between the gears. The rotatable shaft is connected to a motor which drives the shaft for selection of the desired character. Both the motor and foregoing hammer are under control of an eletronic controller which receives instructions from a memory which stores the message to be printed. The paper being printed passes over a roller which serves as the platen against which the type is pressed by the hammer.

In accordance with a further feature of the invention, the carriage carrying the print element is advanced in the transverse direction across the paper by means of a worm gear extending parallel to the roller which serves as the platen, the worm gear engaging with a frame of the carriage by means of a pair of roller bearings carried by the frame. The sides of the worm are inclined relative to a plane which is normal to the axis of the worm. The inclination of the sides of the worm permit precise engagement of the roller bearings, tapered at a corresponding pair of angles, so as to provide for essentially zero backlash in the transverse direction through which the worm gear drives the carriage. The worm gear is driven by a motor under control of the foregoing electronic controller.

The foregoing construction minimizes the number of electrical connections required between the electronic controller and the print head, the print head requiring no more than two leads to energize a solenoid which drives the hammer. In addition, the only remaining elements of the print head are the rotary print element, the beveled gear drive for the rotary print element, and the worm drive for translation of the carriage. This provides a substantial simplification in the construction of the print head. The mechanical power for the rotation of the gears is provided by motors located at a distance from the print head and carriage, the motors being located on stationary portions of the apparatus of the print system.

BRIEF DESCRIPTION OF THE DRAWING

The foregoing aspects and other advantages of the invention are explained in the following description, taken in connection with the accompanying drawings wherein.

DETAILED DESCRIPTION

Figure 1:
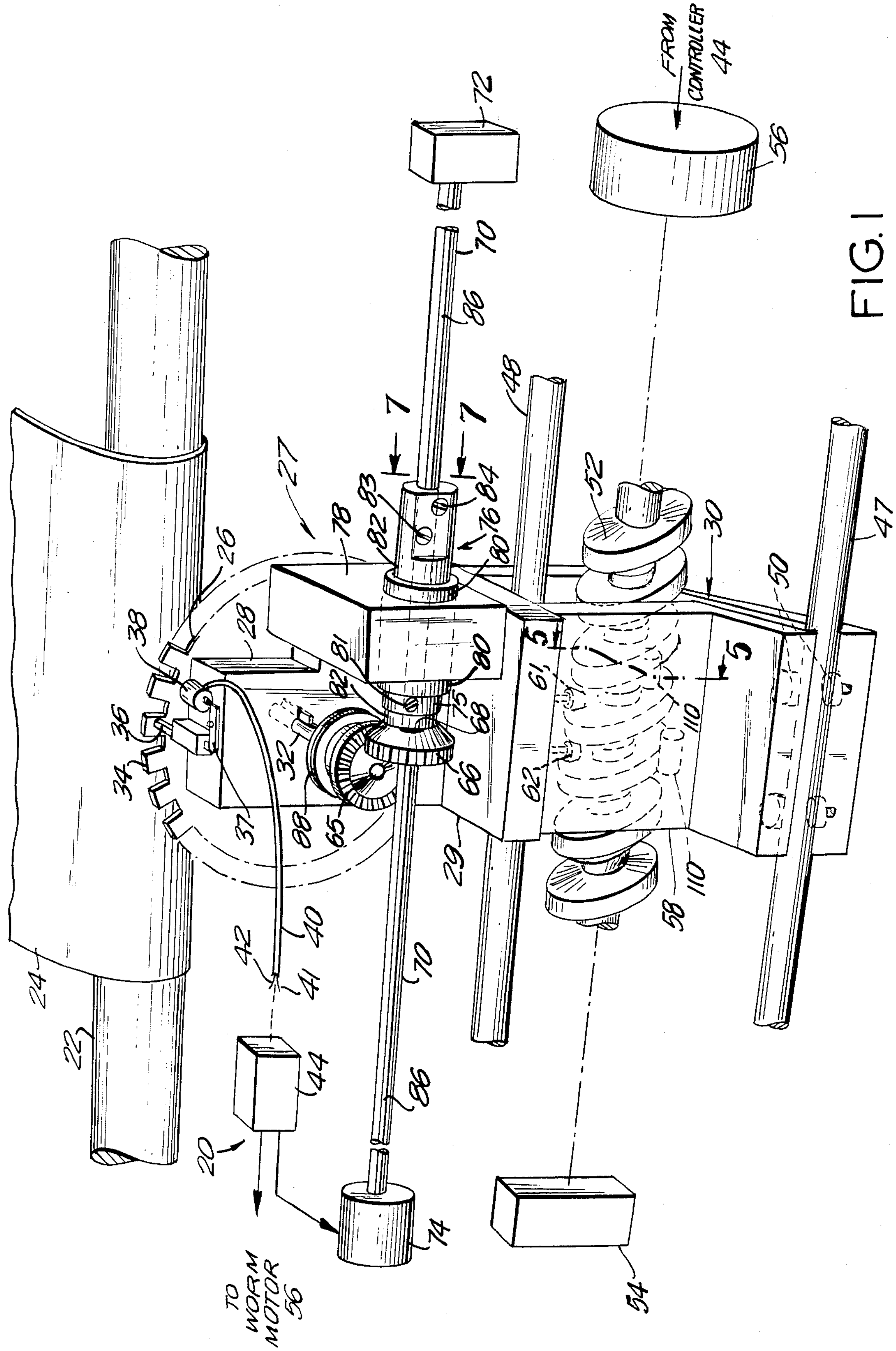
FIG. 1 is a stylized perspective view, partially broken away, of a printing system incorporating the invention.
Figure 2:
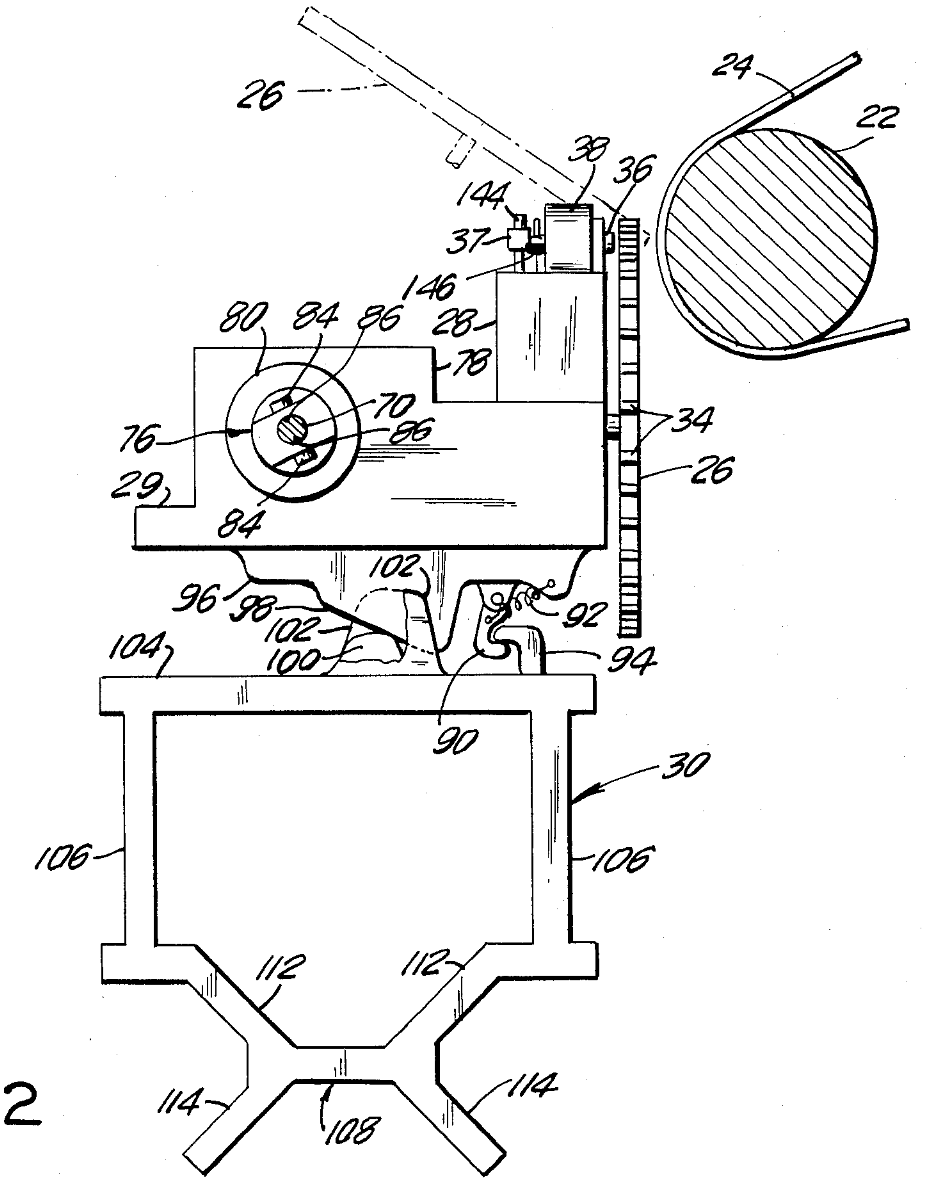
FIG. 2 is a side elevation view of a carriage carrying a print head of FIG. 1.

With reference to FIGS. 1 and 2, there is shown a printer 20 constructed in accordance with the invention. The printer 20 comprises a roller 22 for guiding a sheet of paper 24 past a daisy wheel 26 of a print head 27. The daisy wheel 26 is supported by a leg 28 upstanding from a base 29 of the head 27 and carried by a carriage 30. The daisy wheel 26 is supported by a shaft 32 passing through the leg 28. Individual sections of type 34 extend radially outward from the periphery of the daisy wheel 26 so as to be contacted by a hammer 36 driven via an arm 37 by a solenoid 38. The hammer 36 and the solenoid 38 are mounted on the leg 28. Upon rotation of the daisy wheel 26, the appropriate section of type 34 is placed in front of the hammer 36 so that, upon energization of the solenoid 38, the hammer 36 advances rapidly to strike the type 34 to make an imprint of the desired character upon the paper 24.

The solenoid 38 is connected by a wire 40 having two conductors 41 and 42 to the electrical circuitry of a controller 44. The controller 44, indicated diagramatically in FIG. 1, is disposed at a fixed site away from the movable print head 27. The use of only two conductors 41–42 provides great simplicity to the construction of the print head 27. The electric wire 40 is sufficiently flexible so as to permit movement of the print head 27 transversely along the roller 22.

The carriage 30 of the print head 27 rides on rails 47 and 48, the carriage 30 including rollers 50 for contacting the rails 47 and 48. Transverse movement of the carriage 30 is provided by a worm gear 52, one end of the worm gear 52 being supported by a mount 54, while the opposite end of the worm gear 52 is supported by a motor 56 which also rotates the gear 52 in response to electronic signals applied to the motor 56 by the controller 44. Contact between the worm gear 52 and the carriage 30 is made at a frame 58 of the carriage 30, the frame supporting two rollers 61 and 62 which are beveled for contacting opposite sides of the worm of the gear 52.

The shaft 32 which carries the daisy wheel 26 is driven by a right-angled drive comprising two beveled gears 65 and 66, the gear 65 being located on an end of the shaft 32 opposite the daisy wheel 26. The gear 66 has a central bore 68 which encircles a shaft 70. The shaft 70 is supported at one end by a mount 72 and at the opposite end by a motor 74 which also imparts rotation to the shaft 70. The gear 66 is secured within a sleeve 75 of a linear bearing assembly 76, the latter being rotatably supported within a leg 78 upstanding from the carriage 30. The bearing assembly 76 encircles the shaft 70 and is secured to the leg 78 by bearings 80. A set screw 81 is disposed within the sleeve 75 for tightening against a stem 82 of the gear 66 for retaining the gear 66 in its position within the sleeve 75. The opposite end of the bearing assembly 76 includes two screws 83–84 which force bearings into longitudinal grooves 86 of the shaft 70 as will be described hereinafter.

In accordance of the feature of the invention, the two screws 83–84 may be tightened individually so as to press bearings against respective sides of the keyway 86, and thereby lock the beveled gear 66 rotatably to the shaft 70 while permitting the gear 66 to slide along the shaft 70. As a result, there is essentially no backlash between the rotation of the shaft 70 and the rotation of the gear 66. A disc, or Belleville, spring 88 positioned about the shaft 32 behind the gear 65 urges the gear 65 away from the leg 28 and into contact with the gear 66 so as to provide a precise meshing of the two gears with essentially no backlash in the right-angle drive.

In accordance with a feature of the invention, the arrangement of the beveled gear 65 and 66 includes the gear 65 which is the driven gear and the gear 66 which is the driver gear. The driver gear 66 is made of hardened steel, and the driven gear 65 is fabricated of a softer metal such as aluminum. Both of the gears have the same number of teeth so that there is always the same registration between each of the teeth on one gear and the corresponding teeth on the other gear. Thereby, each tooth of the softer driven gear 65 is able to wear to precisely fit the corresponding hard tooth of the driver gear 66.

The electronic drives for the motors 56 and 74 utilize a well known pulse-width modulation of the electric current provided to the winding of the respective motors 56 and 74. The motors 56 and 74 are each DC (direct current) motors wherein the electrical drive circuitry, contained within the controller 44 has the general form of a feedback circuit. By means of shaft-angle encoders affixed to the rotors of the respective motors 56 and 74, a feedback signal is developed for use with feedback control circuitry. An additional feature of the invention is utilization of memory storing timing signals which designate the inception of slowdown or deceleration, intervals for respective ones of the motors as the daisy wheel 26 approaches its designated orientation, and as the worm gear 52 approaches its requisite number of rotations for bringing the carriage 30 into position. Such circuitry has been utilized in commercially available equipment and is, accordingly, well known. Thereby, the motors 56 and 74 can be driven by their respective feedback loops with little or no overshoot to their respective end positions at each increment of travel.

A further feature of the invention relates to the pivoting of the print head 27 about the carriage 30. This feature is depicted in FIG. 2 which has been simplified by deletion of the roller 50 and the worm gear 52 to more readily show the pivoting feature, the roller 50 to be described in greater detail with respect to FIG. 4 and the worm gear 52 to be further described with reference to FIG. 5. The shaft 70 serves as the pivot about which the print head 27 pivots. The pivoting brings the daisy wheel 26 up and away from the roller 22 so as to permit interchanging of daisy wheels for a changing of the printing font, or the alphabet for the introduction of further mathematical symbols. During operation of the print head 27, the head 27 is secured to the carriage 30 by a latch 90 which is held by a spring 92 in engagement with a hook 94. The latch extends downward from a rib 96 on the underside of the base 29 of the print head 27. A tongue 98 of the rib 96 rests against a bumper 100 on the top of the carriage 30, and sits between a pair of upstanding flanges 102. The flanges 102 secure the tongue 98 for translation of the print head 27 along the worm gear 52 of FIG. 1. A position of the daisy wheel 26 during pivoting is indicated in phantom view. The location of the bumper 100 and the flanges 102 is below the center of gravity of the head 27 for improved dynamic stability during the translation along the worm gear 52. In FIG. 2, one of the flanges 102 is partially cut away to show a portion of the other flange 102 in phantom, as well as showing the contacting of the bumper 100 with the tongue 98.

Also shown in FIG. 2 are the structural components of the carriage 30. Thus, the carriage 30 comprises a platform 104 which supports the hook 94 and the assembly of the bumper 100 and the flanges 102, side walls 106 and a support 108 which interconnects the bottom ends of the side walls 106, and also positions the rollers 50 on the rails 47 and 48, as well as roller 110 (FIGS. 1 and 5) which steady the worm gear 52. The side walls 106 spaced apart the platform 104 and the support 108 to provide a desired spacing for passage of the worm gear 52, as will be described with reference to FIG. 5. The support 108 includes upper arms 112 and lower arms 114, respectively, for positioning the rollers 50 (FIG. 4) and the rollers 110 (FIG. 5).

Figure 3:
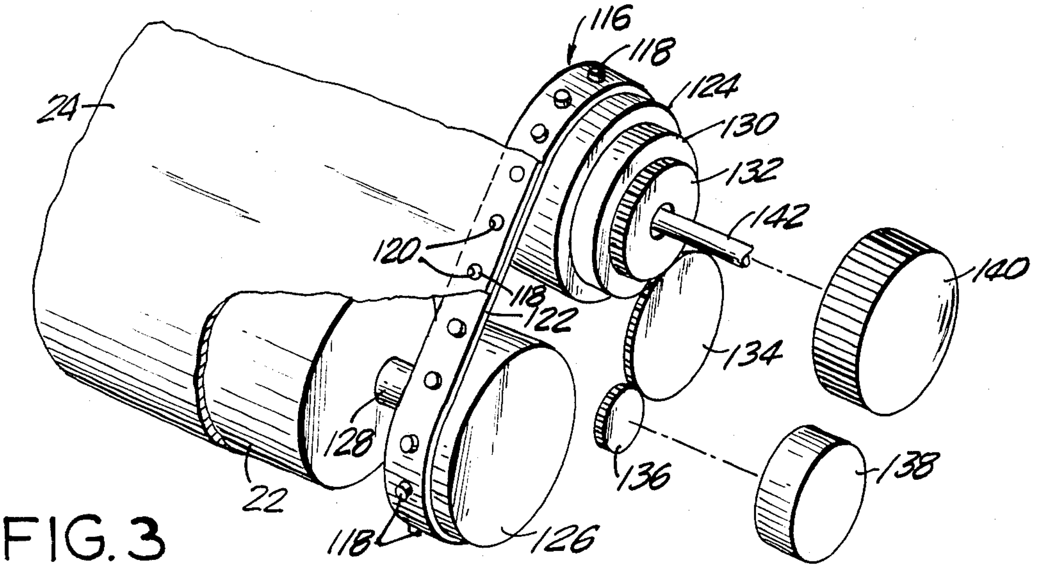
FIG. 3 is a partial view of a tractor assembly for driving paper around a platen roller of FIG. 1.

FIG. 3 shows a further feature of the printer 20, this feature including a tractor 116 having sprockets 118 for engaging with apertures 120 at the edge of the paper 24. The tread 122 of the tractor 116 rides on pulleys 124 and 126. The pulley 126 connects via a shaft 128 to the roller 22 for rotation therewith. The pulley 124 is coupled via a clutch 130 to a gear 132 which, in turn, is driven via a gear 134 by the pinion 136 of an electric motor 138. The motor 138 is driven by conventional electrical circuitry (not shown) for advancing the paper 24 between successive lines which are printed by the head 27. The tractor 116 further includes a knob 140 mounted via a stem 142 to the clutch 130. A pressing of the knob 140 towards the clutch 130 disengages the pulley 124 from the gear 132 and connects the pulley 124 to the knob 140. Thereby, the paper 24 can be advanced mannually by a turning of the knob 140, which manual operation is accomplished with disconnection of the motor 138 and its gearing. Thus, the clutch 130, which is of conventional design, enables alternate drive of the tractor 116, manually via the knob 140 or automatically via the motor 138.

Returning to FIGS. 1 and 2, the hammer 36 which strikes the type 34 is composed of a straight piece of metal of relatively low mass, a mass of 1.4 grams having been used in a preferred embodiment of the invention, to permit fast dynamic response of the hammer 36 for high-speed printing. The arm 37, which extends transversely to connect the hammer 36 with the solenoid 38, pivots about a vertical pivot 144. A spring 146 couples the arm 37 to the housing of the solenoid 38 to return the arm 37 and the hammer 36 to their intial position after actuation by the solenoid 38. The solenoid 38 includes a metallic plunger of magnetizable material which deflects the arm 37 upon energization of the solenoid 38 with electric current of the wire 40. Since the arm 37 is spring-held against the magnetic field, pulsations in the energization current and in the magnetic field result in a pulsating motion of the arm 37 and the hammer 36.

In order to obtain a high rate of printing, the invention provides for a reduction of inertia in each of the mechanical drives; namely, the shaft 70 and the worm gear 52. The shaft 70 is sufficiently narrow in diameter so as to provide a minimal inertia to rotation by the motor 74. Thus, the daisy wheel 26 is able to stop precisely at the desired position. Thus, even though the shaft 70 might be made of a relatively heavy metal, such as steel, the diameter is sufficiently small to insure no more than a negligible amount of inertia.

With respect to the construction of the worm gear 52, a relatively light plastic is utilized since the much larger diameter of the gear 52 would introduce excessive inertia. While not shown in the figures, it is to be understood that it is possible to provide the worm gear 52 with a central core of metal, such as the metal of the shaft 70, for increased rigidity, if desired. The gear 52 is preferably constructed of a low weight material, such as a poly-carbonate so as to permit fast start and stop action by the motor 76 which operates the gear 52.

Twisting in the shaft 70 associated with the rapid acceleration and deceleration is sufficiently small so as to introduce essentially no error in the positioning of the daisy wheel 26. Even upon consideration of the inertia in the daisy wheel 26, there is adequate compensation for shaft wind-up and inertia as provided by operation of the circuitry of the controller 44 and operation of the motor 74. A well-known motor drive circuit of the controller 44 includes a read-only memory and operates by being responsive to the start point and the end point of the shaft travel between two letters to be printed so as to determine which direction is appropriate for rotation of the motor 74 and the daisy wheel 26. Accordingly, the motor 74 is made to rapidly accelerate and then, later, is made to decelerate at a prescribed rate. The deceleration ends with a delay after which there is inserted a high-gain position lock-in. The position error signal is attained by use of a shaft-angle encoder using a photoelectric pick-up with a pair of reticles having slots. The signal is analog utilizing sine voltage and cosine voltage which are later converted by an analog-to-digital converter to digitize the signals. The motor circuit also utilizes a tachometer feedback in addition to the foregoing condition signals. During the deceleration, the high-gain position signal is cut out, the high-gain position signal being switched in only after completion of deceleration.

Figure 4:
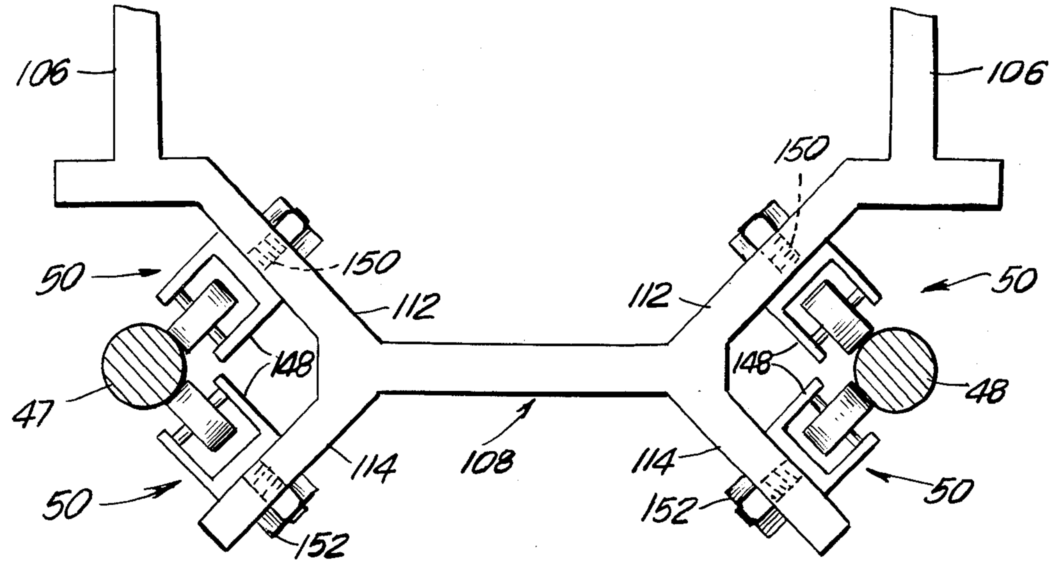
FIG. 4 is a view of the lower portion of the carriage of FIG. 2 showing a set of rollers attached thereto for guiding the carriage along the guide rails of FIG. 1.
Figure 5:
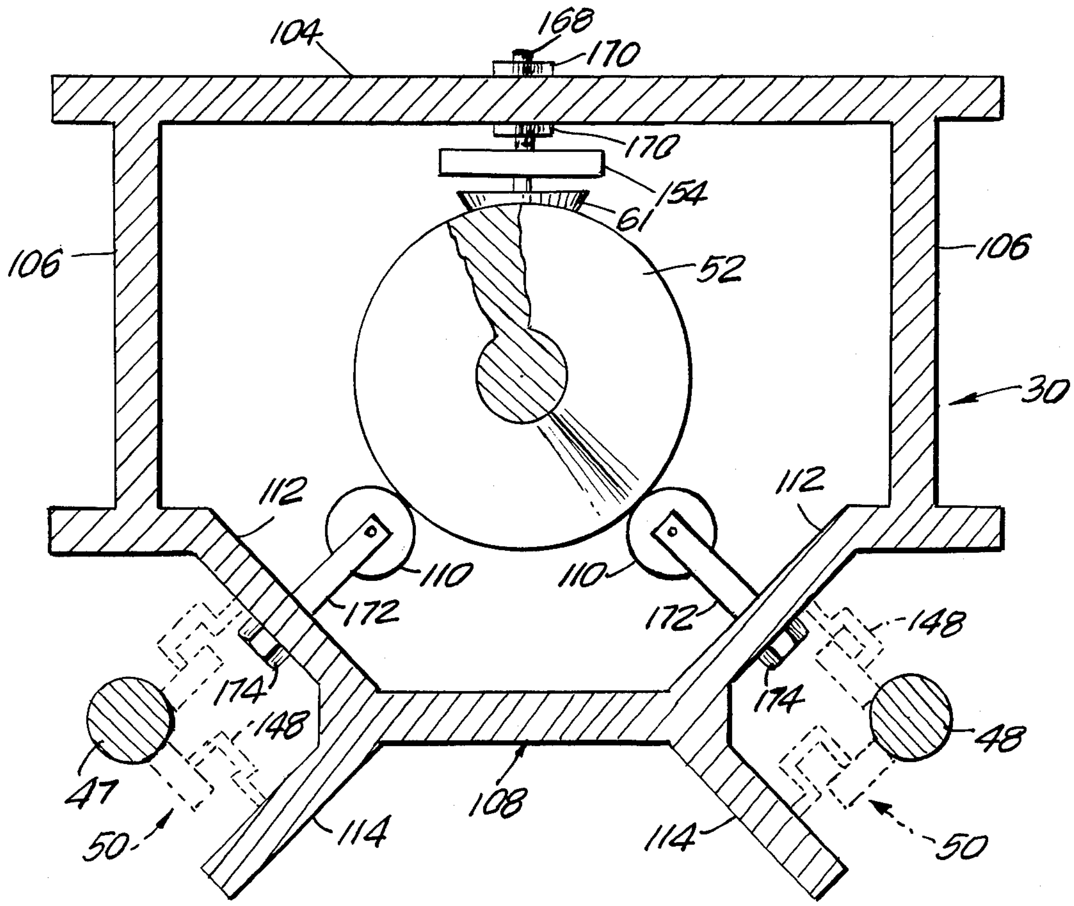
FIG. 5 shows a transverse sectional view of the carriage of FIGS. 1 and 2 taken along the line 5—5 in FIG. 1.

The travelling of the carriage 30 along the rails 47 and 48 is more fully described in FIG. 4 which shows the lower portion of the carriage 30. More specifically, FIG. 4 shows the support 108 with the upper arms 112 and the lower arms 114, the arms 112 and 114 positioning the rollers 50 on the rails 47 and 48 for support of the carriage 30. The two rails 47 and 48 are parallel to each other, there being a total of four rollers 50 engaging the rail 47 and a second set of four rollers 50 engaging the rail 48. The axes of the two upper rollers 50 engaging the rail 47 are angled at 90° relative to the axes of the corresponding lower rollers 50 engaging the rail 47. The axes of the two upper rollers 50 are parallel to each other and, similarly, the axes of the two lower rollers 50 are parallel to each other. A similar arrangement is applied to the four rollers 50 engaging the rail 48, the axes of the upper rollers 50 being parallel to each other, the axes of the lower rollers 50 being parallel to each other, and the axes of the set of upper rollers being angled at 90° relative to the axes of the lower set of rollers. This arrangement securely holds the carriage 30 to the rails 47 and 48. With each of the rails 47 and 48, the upper pair of rollers 50 is held by the upper arms 112 and the lower pair of rollers 50 is held by the lower arms 114. Each roller 50 includes a yoke 148 which grasps an axle of the roller, the yoke being secured by screws 150 and nuts 152 which position the yoke 148 relative to the arms 112 and 114 so as to adjust the spacing between the arms 112 and 114 and the two rails 47 and 48. Thereby, by use of the nuts 152 and the screws 150, the rollers 50 can be adjustably positioned and tightened against the rails 47 and 48. FIG. 4 shows only two of the rollers 50 on each of the rails 47 and 48, it being understood that the second set of rollers is of the same configuration, the second set of rollers 50 for the rail 47 being depicted in FIG. 1.

Figure 6:
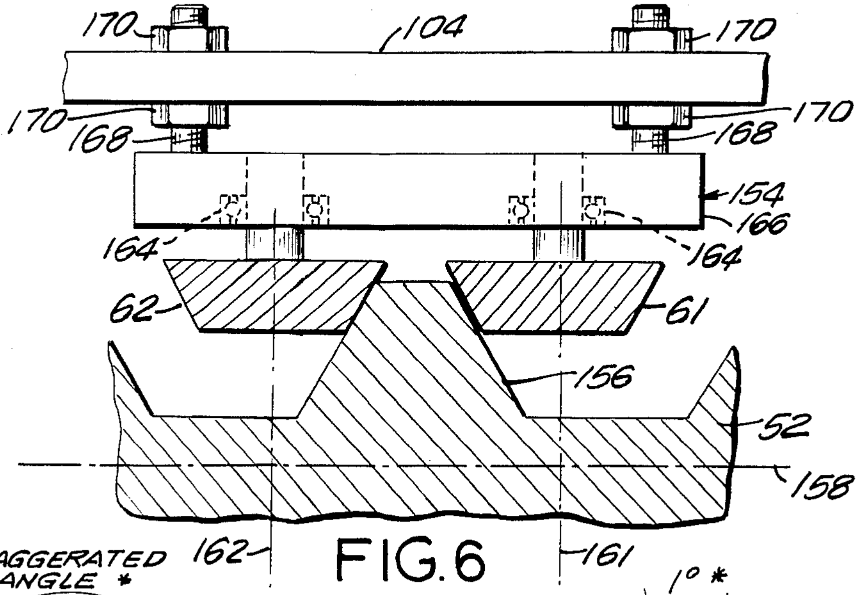
FIG. 6 is a front view of the worm gear and a beveled roller assembly of FIG. 1, the worm gear and the rollers being shown in section.

FIGS. 5 and 6 further show further details of the interconnection of the carriage 30 with the worm gear 52. The view in FIG. 5 is an end view of the carriage 30 looking along the axis of the gear 52. The view in FIG. 6 is a front view of a mount 154 which supports and positions the beveled rollers 61 and 62 relative to a helix 156 of the gear 52. The rollers 61 and 62 and the gear 52 are shown in section, the section being taken along the plane of their respective axes. Only a portion of the gear 52 is shown in FIG. 6 to better describe the mating surfaces between the rollers 61–62 and the helix 156. The sides of the helix 156 are inclined at an angle of 30° relative to a normal to axis 158 of the worm gear 52. The surfaces of the rollers 61–62 are correspondingly inclined by an angle of 30° relative to their axes 161–162, respectively. The arrangement of the surfaces of the roller 61 and the helix 156 provide for an intersection of their tangents at the point of intersection of the axes 158 and 161. Similarly, the arrangement of the surfaces of the roller 62 and the helix 156 provides for an intersection of their tangents at the intersection of the axes 158 and 162.

The rollers 61 and 62 are supported by bearings 164 pivoted against their respective shafts within a base member 166 of the mount 154. The mount 154 further comprises threaded stems 168 and nuts 170 for adjusting the position of the base member 166 relative to the platform 154 of the carriage 30. Thereby, the rollers 61 and 62 can be accurately positioned relative to the worm gear 52.

The rollers 110 are supported by yokes 172 which, in turn, are secured by bolts 174 to the upper arms 112 of the support 108. Adjustment of the bolt 174 advances the rollers 110 in a radial direction of the axis 158 for engagement with the helix 156 of the gear 52. The longitudinal axes of the bolt 174 are angled at 90° in the view of FIG. 5. With respect to the view of FIG. 1, it is seen that the rollers 110 are further spaced apart in the longitudinal direction along the axis 158 of the worm gear 52. Thereby, the two rollers 110, in conjunction with the mount 154, provide a three-point support for the central portion of the worm gear 52. The three-point support is advantageous in maintaining intimate contact between the carriage 104 and the gear 52 independently of any vibrations which may develop in the gear 52 during the stop and start rotations thereof which accompany the step-wise displacement of the carriage 30 and the print head 27 during a printing on the paper 24 of FIG. 1. Since the helix 156 translates as the gear 52 rotates, there is always a portion of the helix 156 contacting the rollers 110 for all rotations of the gear 52. During assembly of the printer 20, the helix 156 is inserted between the rollers 110 and the rollers 61–62 by simply rotating the worm gear 52 so as to thread the helix between the rollers 61 and 62. Also shown in phantom view in FIG. 5 are rollers 50 which hold the carriage 30 relative to the rails 47–48. Thereby, the carriage 30 and the worm 52 are accurately positioned relative to the rails 47–48 as the carriage 30 translates thereon.

Figure 7:
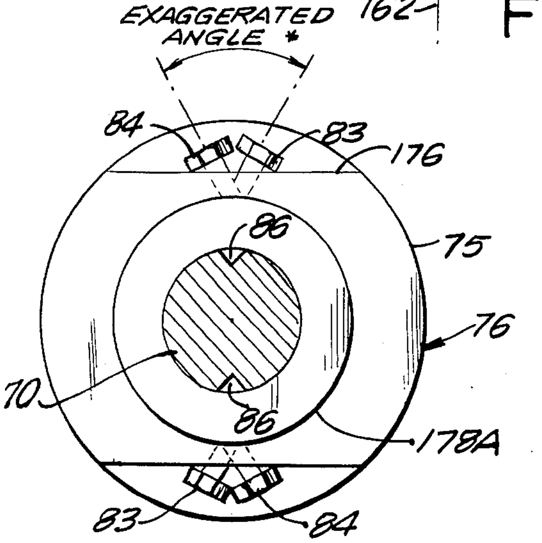
FIG. 7 is an end view of a linear bearing assembly for coupling a shaft of FIG. 1 to a beveled gear.
Figure 8:
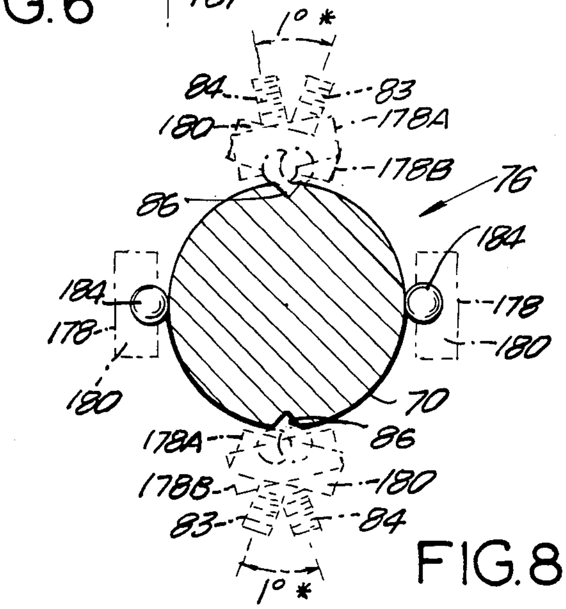
FIG. 8 is a diagrammatic view showing the offsetting of screws which tighten ball bearings of the linear bearing assembly of FIG. 7 against grooves of the shaft.
Figure 9:
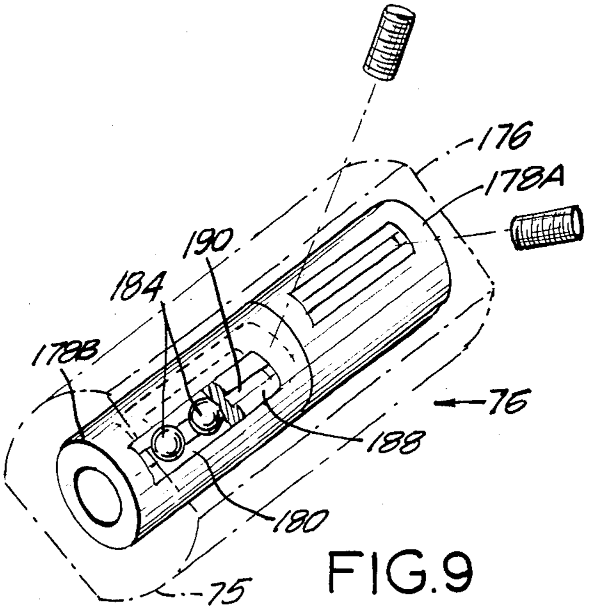
FIG. 9 shows the linear bearing assembly of FIG. 7 in isometric view with an outer sleeve being shown in phantom.

FIGS. 7–10 provide a more complete description of the linear bearing assembly 76 of FIG. 1. FIG. 7 shows an end view of the assembly 76 as viewed along the line 7—7 in FIG. 1, the shaft 70 being shown in section. FIG. 7 also shows a sectional view of the grooves 86 disposed on opposite ends of a diameter of the shaft 70. As has been described in FIG. 1, the assembly 76 includes a sleeve 75 which extends through the leg 78 to the gear 66, the view in FIG. 9 showing the right-hand end of the assembly 76 (FIG. 1) having a shelf 176 for receiving the screws 83–84. As shown in FIG. 9, the linear bearing assembly 76 includes two sets of linear bearings 178, the set to the right being further identified by the legend "A" and the set to the left being further identified by the legend "B". The bearing set 178A is also shown in end view in FIG. 7. Each of the sets of bearings 178 include recirculating races 180 formed within a hardened rubber case 182 for conducting ball bearings 184 along a closed path which contacts the surface of the shaft 70. The ball bearings 184 are inserted through a slot 186 in the case 182, after which the slot 186 is closed off by a cover 188 of metal having a slot 190 for receiving a screw 83 or 84.

Figure 10:
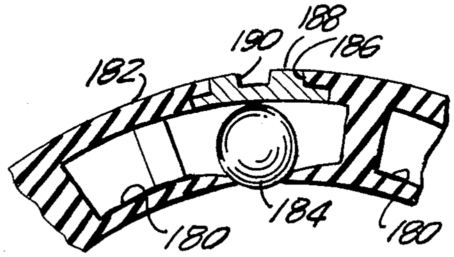
FIG. 10 shows a portion of a linear bearing, the portion being in transverse section to disclose the path of travel of one of the ball bearings.

As shown in FIGS. 9 and 10, the balls 184 roll in the longitudinal direction along the shaft 70 and are then lifted away from the shaft by the race 180 to return along the closed path.

The bearing sets are shown diagrammatically in FIG. 8. Each of the sets 178A–B include four recirculating races 180 which are disposed with 90° spacing about the shaft 70. The four races 180 in each of the sets 178A–B accurately position the bearing assembly 76 about the shaft 70. The races 180 which are located at the grooves 86 are shown angled relative to a diameter of the shaft 70 so as to indicate the direction of forces of the screws 83 and 84 against the edges of the grooves 86. The angulation is approximately 1° between a pair of screws 83 and 84, and angulation in FIG. 8 being exaggerated to show the urging of the ball bearings 184 against the edges of the groove 86. The case 182 has resiliency so that the covers 188 may be directed in the direction of the corresponding screws 83–84 for transmitting the force of the screws 83–84 through the balls 184 towards the shaft 70. The angulation of the screws 83–84 directs the balls 184 of the bearing sets 178A against one set of edges of the grooves 86 in a clockwise direction of the shaft 70, while the ball bearings 184 of the bearing set 178B is directed against the grooved edges in a counter-clockwise direction about the shaft 70. Thereby, torque is exerted both in the counter-clockwise and in the clockwise direction to militate against any backlash which might otherwise be developed in the transmission of rotation from the shaft 70 to the shaft 32 and the daisy wheel 26 of FIG. 1. Thus, an anti-backlash function is provided by the bearing assembly 76 as it translates along the shaft 70, a smooth translation being provided by the rolling of the ball bearings 184 via the races 180 along the surface of the shaft 70.

The foregoing construction features provide for a smooth and an accurate positioning of the print head for the printing of the various letters. In addition, the foregoing construction also provides for an accurate rotation of the daisy wheel 26 in the selection of the letter or other character to be printed. Furthermore, the foregoing construction features of the invention have minimized angular inertia to permit rapid dynamic response in the driving of the daisy wheel 26 for rapid and accurate printing. In addition, the invention reduces the total amount of mass of the print head 27 and the carriage 30 for rapid translation across the paper 24 for imprinting a succession of letters or other characters. The reduction in mass permits the motor 56 to rapidly start and stop the rotation of the worm gear 52 to advance the position of the print head 27, to hold the print head in position for an imprinting, and then to advance the print head 27 to a further position. A reduction in mass is also accomplished by reduced wiring requirements, there being only two conductors 41-42 connecting with the print head 27. Thereby, a rapid and accurate printing can be accomplished.

It is to be understood that the above-described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A print guide mechanism comprising:

a rotary print element;

a right-angle drive for imparting rotation to said rotary print element for the selection of a character to be printed by a type section of said element;

a carriage for carrying said rotary print element in a direction transverse to a medium receiving the printing by said print element;

a shaft having longitudinal groove means extending transversely of said printing medium, said right-angle drive comprising a gear slidably disposed about said shaft for rotation therewith, said mechanism further comprising key means connecting said gear with said groove means for inhibiting backlash between said gear and said shaft;

said key means comprising linear bearing means for permitting translation of said key means along said shaft, rotationally locking said gear to said shaft;

said linear bearing means of said key means including screws angled relative to a diameter of said shaft for directing ball bearings to said linear bearing into contact with edges of said groove means;

means for rotating said shaft to a designated position for selection of a character to be printed, said rotation means being disposed at a stationary site distant from said movable carriage;

worm means for translating said carriage along said shaft, said worm means including a pair of beveled rollers carried by said carriage for mating with inclined surfaces of a worm of said worm means for inhibiting backlash between said worm means and said carriage; and means for rotating a worm gear of said worm means to advance said carriage to a desired position for printing a character on said printing medium, and wherein said rotating means is located at a stationary site distant from said carriage.

2. A print guide mechanism according to claim 1, wherein said groove means comprise a pair of V-shaped grooves diametrically positioned on said shaft.

3. A print guid mechanism according to claim 2, wherein said linear bearing means of said key means include a pair of ball races and two pairs of diametrically disposed screws, each pair of screws being angled relative to a diameter of said shaft for directing ball bearings of respective races into contact with opposite edges of respective V-shaped grooves.

4. A print guide mechanism according to claim 1, wherein said screws are angled for directing ball bearings against opposite edges of said groove means to produce clockwise and counter-clockwise torques which inhibit said backlash.

5. A print guide mechanism according to claim 1, wherein said right angle drive compises two beveled gears, the first of which is said gear slidably disposed about said first mentioned shaft, the second beveled gear being disposed on a driven shaft extending to said rotary print element, said second gear having central bore through which said driven shaft extends and spring means are provided for urging said second gear into contact with said first gear.

6. A print guide mechanism according to claim 5 wherein said first gear is made of a harder material than said second gear.

7. A print guide mechanism according to claim 1, further comprising a tractor means for positioning a medium for receiving printing; said tractor means having a clutch, a manually operable knob and a motor, said knob and said motor being alternately connectable by said clutch to a tread of said tractor means in response to a translatory movement of said knob for alternatively driving said tread by said motor or by said knob.

8. A print guide mechanism according to claim 7, wherein said worm means further comprises a set of rollers positioned by said carriage against successive turns in a helix of said worm for providing, in conjunction with said pair of beveled rollers, a three-point support for said worm gear to isolate the portion of said worm gear adjacent said carriage from vibrations induced by rotation of said worm gear.

9. A print guide mechanism according to claim 1, wherein said worm means further comprises a set of rollers positioned by said carriage against successive turns in a helix of said worm for providing, in conjunction with said pair of beveled rollers, a three-point support for said worm gear to isolate the portion of said worm gear adjacent said carriage from vibrations induced by rotation of said worm gear.

10. A print guide mechanism according to claim 1, wherein said worm means further comprises a set of rollers positioned by said carriage against successive turns in a helix of said worm for providing, in conjunction with said pair of beveled rollers, a three-point support for said worm gear to isolate the portion of said worm gear adjacent said carriage from vibrations induced by rotation of said worm gear.

11. A print guide mechanism according to claim 1 wherein rail means, extending parallel to said shaft and to said worm means, are provided for further supporting said carriage; and roller means are provided between said carriage and said rail means for rolling said carriage along said rail means.

12. A print guide mechanism according to claim 11, wherein said rail means comprises a rail on either side of the longitudinal extension of said worm, said roller means comprising at least one pair of rollers contacting each said rail at substantially 90° relative to one another about the axis of a respective rail.

13. A print guide mechanism according to claim 1, further comprising a frame securing said print element to said right-angle drive, said frame being rotatable about said shaft for pivoting said print element away from said medium to permit interchanging of elements of said print element.

14. A print guide mechanism comprising:

a rotary print element;

a right-angle drive for imparting rotation to said rotary print element for the selection of a character to be printed by a type section of said element;

a carriage for carrying said rotary print element in a direction transverse to a medium receiving the printing by said print element;

a shaft having longitudinally groove means extending transversely of said printing medium, said right angle drive comprising a gear slidably disposed about said shaft for rotation therewith, said mechanism further comprising key means connecting said gear with said groove means for inhibiting backlash between said gear and said shaft;

means for rotating said shaft to a designated position for selection of a character to be printed, said rotation means being disposed at a stationary site distant from said movable carriage;

worm means for translating said carriage along said shaft, said worm means including a pair of beveled rollers carried by said carriage for mating with inclined surfaces of a worm of said worm means for inhibiting backlash between said worm means and said carriage;

means for rotating a worm gear of said worm means to advance said carriage to a desired position for printing a character on said printing medium, and wherein said rotating means is located at a stationary site distant from said carriage;

a frame securing said print element to said right angle drive, said frame being rotatable about said shaft for pivoting said print element away from said medium to permit interchanging of elements of said print element; and a tractor means for positioning a medium for receiving printing; said tractor means having a clutch, a manually operable knob and a motor, said knob and said motor being alternately connectable by said clutch to a tread of said tractor means in response to a translatory movement of said knob for alternatively driving said tread by said motor or by said knob.

15. A print guide mechanism according to claim 14, wherein said worm means further comprises a set of rollers positioned by said carriage against successive turns in a helix of said worm for providing, in conjunction with said pair of beveled rollers, a three-point support for said worm gear to isolate the portion of said worm gear adjacent said carriage from vibrations induced by rotation of said worm gear.

16. A print guide mechanism comprising:

a rotary print element;

a right-angle drive for imparting rotation to said rotary print element for the selection of a character to be printed by a type section of said element;

a carriage for carrying said rotary print element in a direction transverse to a medium receiving the printing by said print element;

a shaft having longitudinal groove means extending transversely of said printing medium, said right-angle drive comprising a gear slidably disposed about said shaft for rotation therewith, said mechanism further comprising key means for inhibiting backlash between said gear and said shaft;

said key means comprising linear bearing means for permitting translation of said key means along said shaft, rotationally locking said gear to said shaft;

said linear bearing means of said key means including means angled relative to a diameter of said shaft for directing ball bearings of said linear bearing into contact with edges of said groove means;

means for rotating said shaft to a designated position for selection of a character to be printed, said rotation means being disposed at a stationary site distant from said movable carriage; and means for translating said carriage transversely of said printing medium.

17. A print guide mechanism according to claim 16, wherein said carriage translating means includes a rotatable member and means located at a stationary site distant from said carriage for rotating said rotatable member to impart translation to said carriage.

18. A print guide mechanism according to claim 16, wherein said ball bearing directing means are screws, angled for directing ball bearings against opposite edges of said groove means to produce clockwise and counter-clockwise torques which inhibit said backlash.

19. A print guide mechanism according to claim 18, wherein said groove means comprise a pair of V-shaped grooves diametrically positioned on said shaft.

20. A print guide mechanism according to claim 19, wherein said linear bearing means of said key means include a pair of ball races and two pairs of diametrically disposed screws, each pair of screws being angled relative to a diameter of said shaft for directing ball bearings of respective races into contact with opposite edges of respective V-shaped grooves.

21. A print guide mechanism according to claim 16, further comprising a frame securing said print element to said right-angle drive, said frame being rotatable about said shaft for pivoting said print element away from said medium to permit interchanging of elements of said print element.

22. A print guide mechanism according to claim 21, further comprising a tractor means for positioning a medium for receiving printing; said tractor means having a clutch, a manually operable knob and a motor, said knob and said motor being alternately connectable by said clutch to a tread of said tractor means in response to a translatory movement of said knob for alternatively driving said tread by said motor or by said knob.

23. A print guide mechanism according to claim 16, further comprising a tractor means for positioning a medium for receiving printing; said tractor means having a clutch, a manually operable knob and a motor, said knob and said motor being alternately connectable by said clutch to a tread of said tractor means in response to a translatory movement of said knob for alternatively driving said tread by said motor or by said knob.

24. A print guide mechanism according to claim 16, wherein rail means, extending parallel to said shaft, are provided for supporting said carriage, and roller means are provided between said carriage and said rail means for rolling said carriage along said rail means.

25. A print guide mechanism according to claim 24, wherein said rail means comprises a pair of parallel rails, said roller means comprising at least one pair of rollers contacting each said rail at substantially 90° relative to one another about the axis of a respective rail.

* * * * *